United States Patent [19]

Maringer

[11] Patent Number: 5,143,382
[45] Date of Patent: Sep. 1, 1992

[54] PRESSURE RELIEVING SLIPPER SEAL SYSTEM

[75] Inventor: Martin M. Maringer, Fort Wayne, Ind.

[73] Assignee: W. S. Shamban & Company, Santa Monica, Calif.

[21] Appl. No.: 664,341

[22] Filed: Mar. 4, 1991

[51] Int. Cl.⁵ ............................................. F16J 15/48
[52] U.S. Cl. ........................ 277/29; 277/165; 277/177; 277/188 A; 277/215
[58] Field of Search ........... 277/29, 165, 177, 188 R, 277/188 A, 201, 215, 70

[56] References Cited

U.S. PATENT DOCUMENTS

| | | | |
|---|---|---|---|
| 2,520,306 | 8/1950 | Detweiler | 277/188 A X |
| 2,728,620 | 12/1955 | Kruger | 277/188 A |
| 2,843,434 | 7/1958 | Orloff et al. | |
| 3,027,168 | 3/1962 | Herbruggen | 277/215 |
| 3,214,182 | 10/1965 | Hurbruggen | |
| 3,368,650 | 2/1968 | Wasdell | 277/70 X |
| 3,663,024 | 5/1972 | Traub | 277/165 |
| 3,678,809 | 7/1972 | Doutt | 277/29 X |
| 4,089,534 | 5/1978 | Litherland | |
| 4,231,578 | 11/1980 | Traub | |
| 4,268,045 | 5/1981 | Traub | |
| 4,458,717 | 7/1984 | Boland | |
| 4,674,754 | 6/1987 | Lair et al. | |
| 4,681,326 | 7/1987 | Kubo | 277/165 X |
| 4,736,586 | 4/1988 | Kawajiri et al. | 277/215 X |
| 4,893,823 | 1/1990 | Strouse et al. | |
| 4,921,258 | 5/1990 | Fournier et al. | 277/29 |
| 4,953,876 | 9/1990 | Muller | |

FOREIGN PATENT DOCUMENTS

| | | | |
|---|---|---|---|
| 646584 | 8/1962 | Canada | 277/201 |
| 3931163 | 3/1990 | Fed. Rep. of Germany | 277/165 |
| 789618 | 1/1958 | United Kingdom | 277/165 |

Primary Examiner—William A. Cuchlinski, Jr.
Assistant Examiner—Scott W. Cummings
Attorney, Agent, or Firm—Baker & Daniels

[57] ABSTRACT

A sealing system for use in sealing a rod bore and reciprocating rod including a first and second sealing assembly. The first sealing assembly, disposed within a gland in the rod bore wall, comprises a seal ring, non-sealing backup rings, and an energizer that seals only in one direction. The energizer has axial and radial grooves permitting one way sealing. The backup rings have channels preventing sealing in either direction. One embodiment of sealing system includes the first seal assembly containing no downstream backup ring.

14 Claims, 5 Drawing Sheets

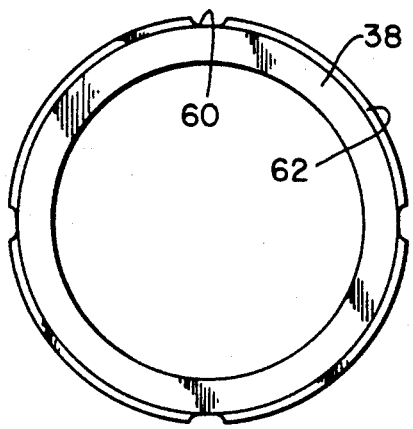
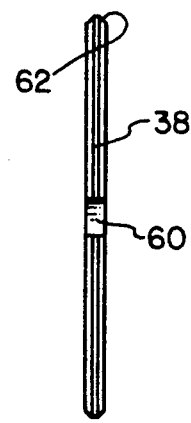
FIG. 4A  FIG. 4B
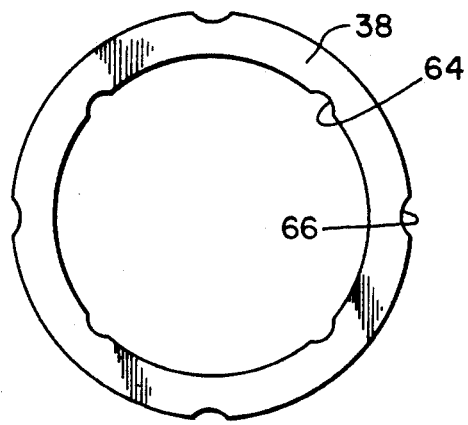
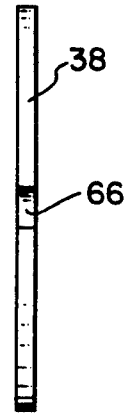
FIG. 5A  FIG. 5B
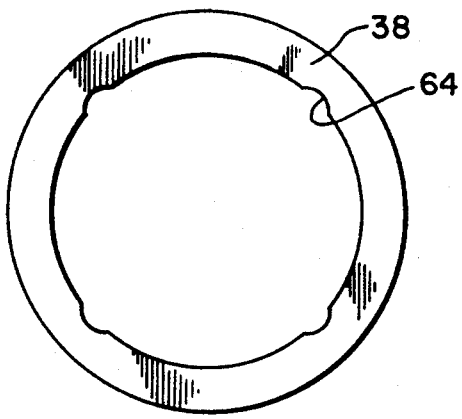
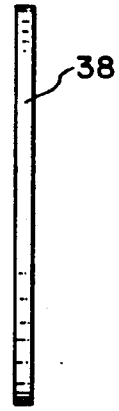
FIG. 6A  FIG. 6B

PRESSURE RELIEVING SLIPPER SEAL SYSTEM

BACKGROUND OF THE INVENTION

The present invention relates generally to a dual unvented sealing system and, more particularly, to a sealing system having primary and secondary seals wherein the primary seal can release the interstage pressure when system pressure is reduced.

In many applications of hydraulic systems, such as in modern aircraft, there is a need to be able to manually extend and retract the rod connected to an actuator. Because of the new composite designs of aircraft bodies, when repairs are to be accomplished, one cannot jump up and down on the flight control surfaces to connect the flight control surfaces to the actuators. One has to be able to manually move the actuator to the control surface. Interstage pressure buildup or trapping between dual unvented seals of the actuator, prevents easy manual reversal of the actuator rod because the seals remain energized.

Prior solutions to solving this pressure buildup problem between the two seals involved providing one of the seals with two backup rings that shift within the seal gland. In this case, the groove or gland in which the seal sits allows the seal to move back and forth axially upon the rod. It was believed that, upon system pressure reduction, the seals would move within the glands away from the interstage pressure volume thus creating a larger volume for the pressurized fluid between the two seals, whereby the increased volume would act to reduce the interstage pressure. However, in practice the pressure did not drop enough to solve the problem.

Another attempt to solve the problem was by putting a pressure relieving notch in the elastomer and to provide narrow backup rings. This construction did not consistently relieve interstage pressure at all times, since the backup ring itself could act to seal within the rod bore glands.

Another problem of prior art dual sealing systems was seal extrusion with a sufficient temperature increase of the interstage volume.

The present invention is directed to overcoming the aforementioned problems associated with dual unvented seal systems, wherein it is desired to provide a primary seal permitting reliable pressure relief of the interstage area between the primary and secondary seals, to allow manual movement of the actuator rod or piston.

SUMMARY OF THE INVENTION

The present invention overcomes the disadvantages of the above described prior seals by providing a primary seal with an improved pressure relieving mechanism capable of relieving interstage pressure. Generally, the invention provides two seal assemblies disposed in two glands between a rod bore or cylinder and a reciprocating rod or piston, wherein the first and second seal assemblies define an interstage volume, with the first seal assembly including a pressure relieving means for relieving the pressure in the interstage volume.

The pressure relieving means comprises a seal ring, an energizer, and at least one backup ring. The seal ring provides a high pressure seal between the rod bore and reciprocating rod. The energizer, formed from an elastomer material, urges the seal ring into sealing engagement with the rod. At least one backup ring is disposed between the gland walls and the energizer-seal ring combination to prevent seal extrusion. A backup ring upstream from the energizer-seal ring combination permits pressure relief, while an optional backup ring downstream from the energizer-seal ring combination seals with the rod and prevents extrusion.

An advantage of the sealing system of the present invention is that the pressure within the interstage volume, after system pressure is lowered, is relieved, thereby allowing manual movement of the rod within the rod bore.

Another advantage of the sealing system of the present invention is that of the low friction between the seals and the rod because of the diminished pressure buildup in the interstage area.

Another advantage of the sealing system of the present invention is that of potential longer seal system life and potential longer seal life, since the seal assemblies are placed under a decreased pressure load when pressure in the interstage volume is relieved.

A further advantage of the sealing system of the present invention is consistent venting of the pressure buildup within the interstage pressure volume.

Yet another advantage of the sealing system of the present invention is the provision of backup rings which do not seal, but allow the interstage pressure to be relieved without seal extrusion.

Yet another advantage of the sealing system of the present invention is that it allows for a temperature increase of the interstage volume and relief of the attendant interstage pressure without any potential extrusion of the seals.

The invention, in one form thereof, provides a sealing system for use in sealing a rod bore and reciprocating rod. The sealing system includes two glands in either the rod bore or rod to retain first and second seal assemblies. The two assemblies define an interstage volume. The first seal assembly comprises a pressure relieving means to relieve pressure in the interstage volume, thereby reducing friction between the rod bore and rod.

In accordance with one aspect of the previously described form of the present invention, the pressure relieving means in the first seal assembly includes a elastomeric energizer, a high pressure seal ring, and at least one non-sealing backup ring. The energizer has a plurality of radial and axial grooves along its circumference and radial faces to allow the energizer to seal in a downstream direction toward the interstage volume, but not seal in an upstream direction from the interstage volume. Consequently, this arrangement relieves pressure in the interstage pressure when the sealing system is not under system pressure.

In accordance with one aspect of the previously described form of the present invention, the sealing system may operate in either a pressurized state or a pressure relieved state.

According to a further aspect of the invention, at least one backup ring is also retained in the gland along with the energizer and seal ring. The upstream backup ring has a channel means cut into the ring to prevent sealing. The channel means may comprise a butt cut or missing sector in the backup ring. The downstream backup ring also has a channel means cut into it, but in this case the channel means comprises a circumferential chamfer and an axial notch to prevent backup ring sealing in the relieving mode only.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 2b is a side view of the backup ring of FIG. 2a;

FIG. 3b is a side view of the backup ring of FIG. 3a;

FIG. 4a is a top view of an embodiment of the downstream backup ring of the assembly of FIG. 1, particularly showing axial notches and a chamfer;

FIG. 4b is a side view of the backup ring of FIG. 4a;

FIG. 5a is a top view of an alternative embodiment of the downstream backup ring of the assembly of FIG. 1;

FIG. 5b is a side view of the backup ring of FIG. 5a;

FIG. 6a is a top view of another alternative embodiment of the downstream backup ring of the assembly of FIG. 1;

FIG. 6b is a side view of the backup ring of FIG. 6a;

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 1:
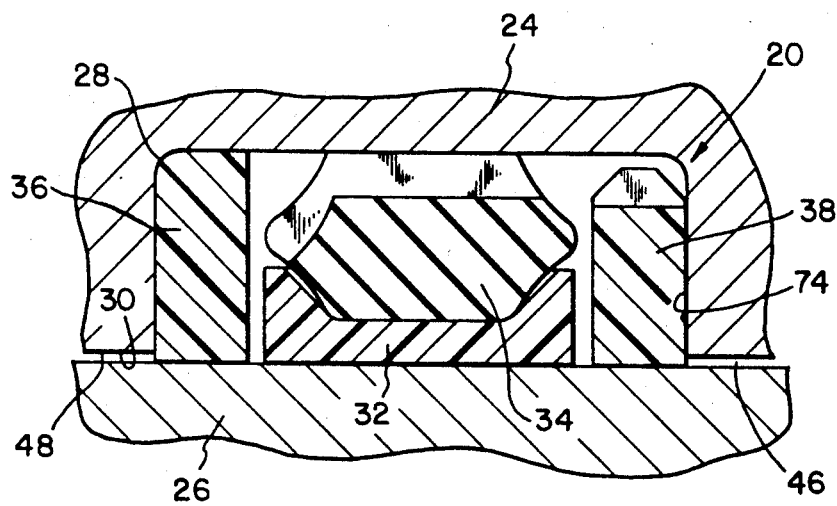
FIG. 1 is a cross sectional view of the first seal assembly of the sealing system, according to the present invention.
Figure 9:
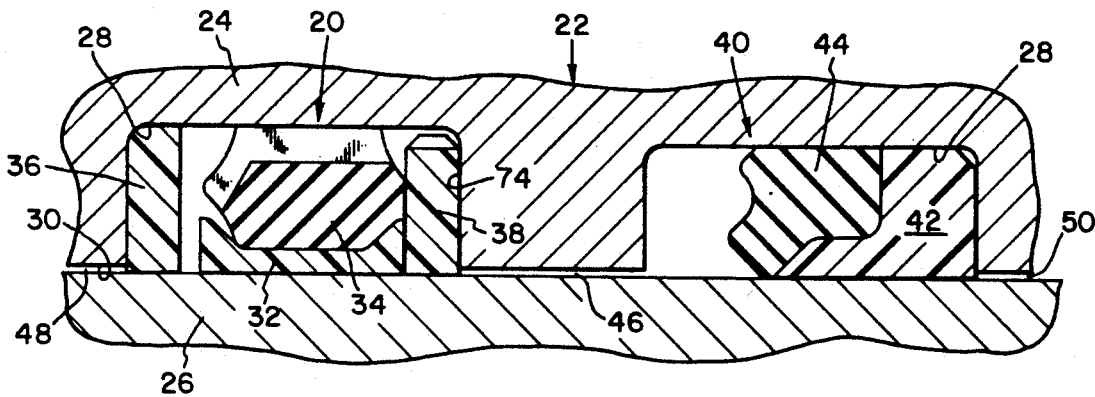
FIG. 9 is a cross sectional view of an alternative embodiment of the sealing system of present invention in a pressurized state.

In one embodiment of the invention as shown in the drawings and in particular by referring to FIGS. 1 and 9, the first or primary seal assembly 20 (FIG. 1) is incorporated in the dual unvented sealing system 22 of (FIG. 9). The dual unvented sealing system 22 which provides a seal between a rod bore 24 and a reciprocating rod 26 is shown disposed in glands 28 in rod bore wall 30. Alternatively glands 28 may be located in rod 26.

The first or primary seal 20 includes an annular seal ring 32, an annular elastomeric energizer 34, both bounded in the upstream and downstream directions by annular backup rings 36 and 38 respectively. The specific parts of first seal 20 will be more thoroughly described herein.

The second or secondary seal assembly 40 is a known seal that can effectively seal between rod bore 24 and rod 26. An effective second seal 40 may be made of an annular seal ring 42 and an annular elastomeric energizer 44. Seals of this type are described in U.S. Pat. Nos. 4,268,045 and 4,231,578 and are hereby explicitly incorporated by reference.

The first seal assembly 20 and second seal assembly 40 define an interstage volume 46. The first seal assembly 20 also separates the system pressure region 48 at system pressure, from interstage volume 46. This system pressure region 48 is considered upstream from the sealing system 22. Likewise the second seal assembly 40 separates the interstage volume 46 and ambient or outside pressure region 50, which is considered downstream from sealing system 22.

Figure 2A:
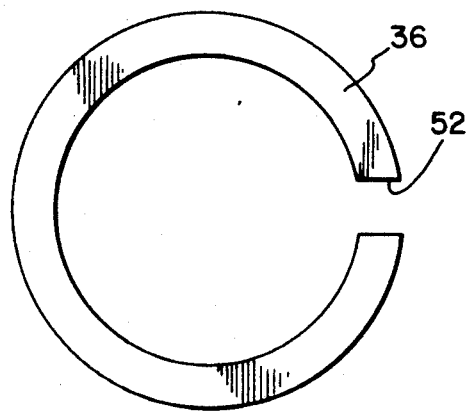
FIG. 2a is a top view of an embodiment of the upstream backup ring of the assembly of FIG. 1, particularly showing the pressure relieving channel.
Figure 2B:
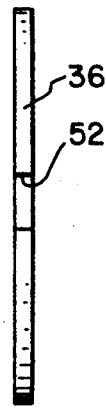

The specific parts of the first seal assembly will now be discussed. By referring to FIG. 2a, an embodiment of the upstream backup ring 36 is shown wherein a channel means 52, specifically a butt cut or removed section of backup ring 36, prevents backup ring 36 from sealing within the gland 28. The discontinuity of upstream backup ring 36 prevents the ring from sealing within gland 28.

Figure 3A:
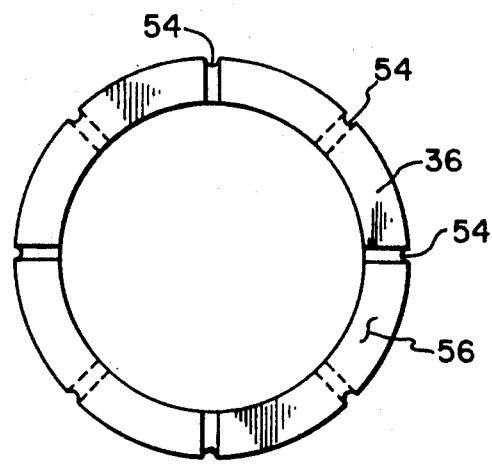
FIG. 3a is a top view of an alternative design of the upstream backup ring of the assembly of FIG. 1.
Figure 3B:
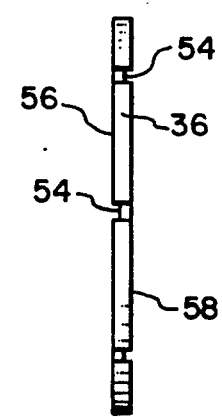
Figure 7:
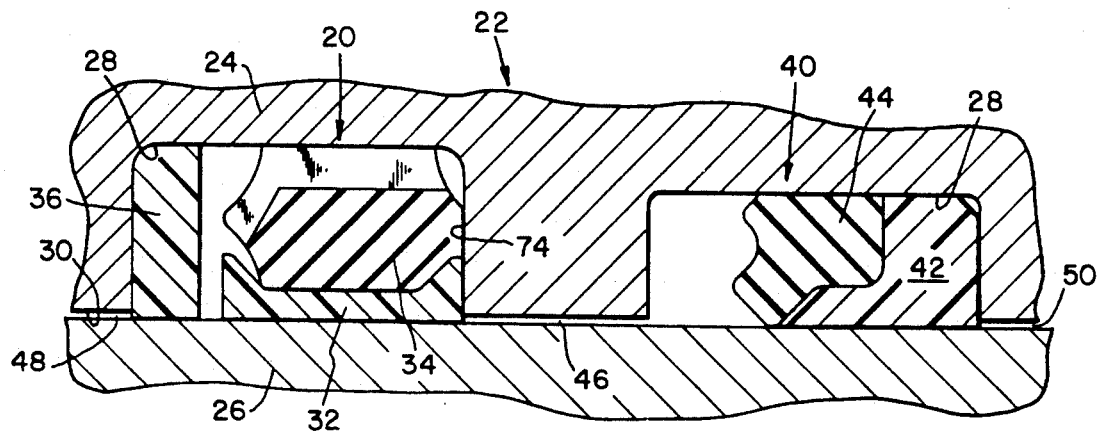
FIG. 7 is a cross sectional view of the sealing system of the present invention in a pressurized state.

FIGS. 3a and 3b are an alternative embodiment of upstream backup ring 36 in which channels 54 on both faces 56 and 58 prevent upstream backup ring 36 from sealing within gland 28.

The embodiment of downstream backup ring 38 as seen in FIG. 4a, shows axial notches 60 and a chamfer 62 along the circumference to prevent sealing within gland 28 when the seal system is in a relieving state. Chamfer 62 prevents the downstream backup ring 38 from sealing in gland corner when the seal system 22 is in a relieving state. FIGS. 5 and 6 show alternative embodiments of downstream backup ring 38 which also prevent sealing in the relieving state, including inside axial notches 64 and circumferential axial notches 66.

Figure 11:
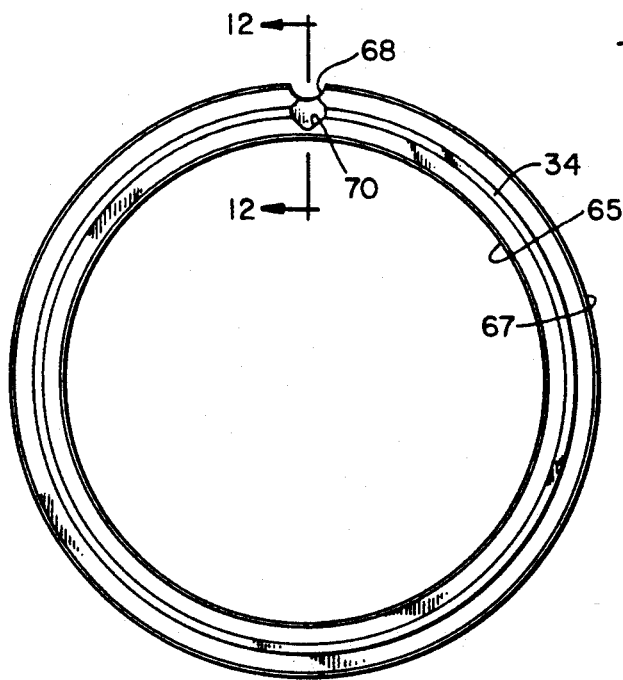
FIG. 11 is a top view of the energizer of FIG. 1.
Figure 12:
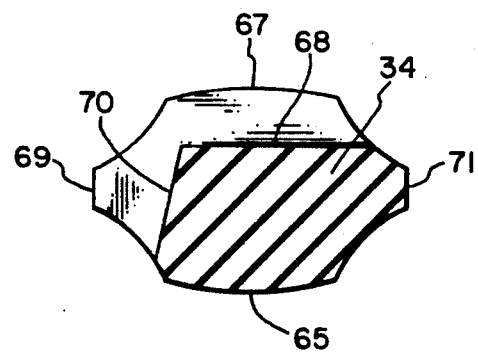
FIG. 12 is a cross sectional view of the energizer of FIG. 11 taken along the line 12—12.

The energizer 34 shown in FIG. 1 is best viewed separately in FIG. 11 wherein the pressure relieving means is shown. The energizer 34 has an inside diameter 65, circumference 67 and a first and second radial face 69 and 71. An axial channel 68 along the circumference 67, and a radial channel 70 along upstream first radial face 69, prevent sealing in the upstream direction while allowing sealing in the downstream direction, when system pressure is greater than interstage pressure (i.e. pressure within interstage volume 46). The axial channel 68 connects first and second radial faces 69 and 71. The radial channel 70 along the upstream first radial face 69 connects inside diameter 65 to circumference 67.

Figure 13:
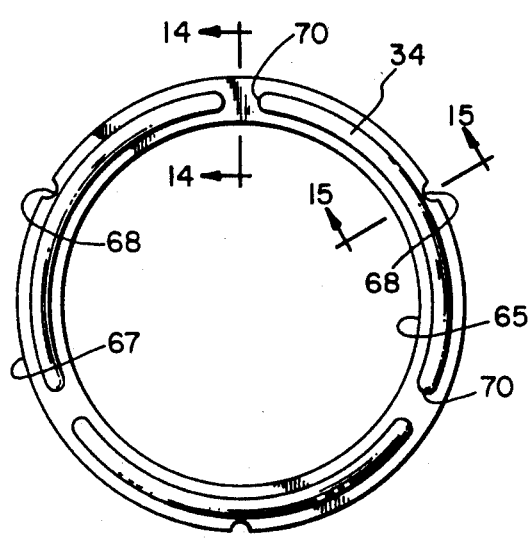
FIG. 13 is a top view of an alternative embodiment of the energizer.
Figure 14:
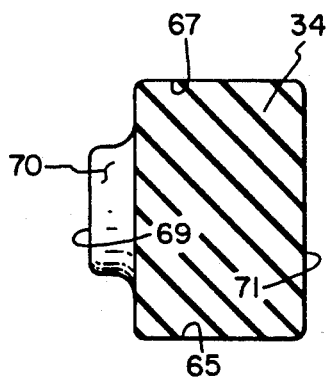
FIG. 14 is a cross sectional view of the energizer of FIG. 13 taken along the line 14—14.
Figure 15:
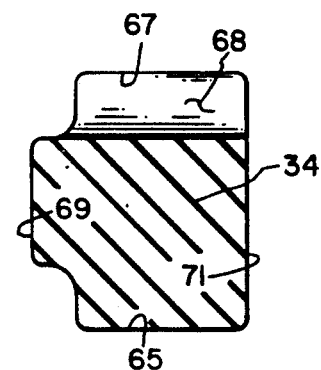
FIG. 15 is a cross sectional view of the energizer of FIG. 11 taken along the line 15—15.
Figure 16:
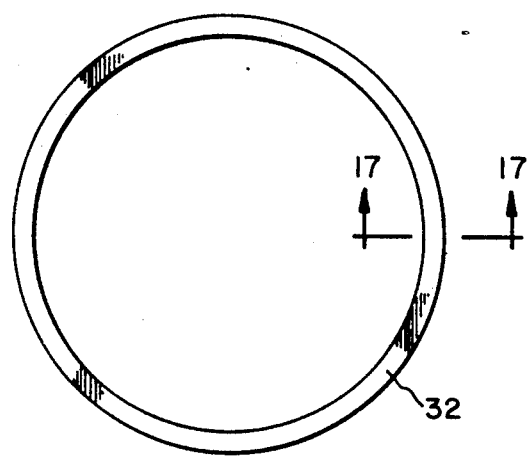
FIG. 16 is a top view of a seal ring.

An alternate embodiment of the energizer 34 is shown in FIG. 13 showing more axial and radial notches. FIG. 14 shows a cross section of elastomeric energizer 34 through radial channel 70. FIG. 15 is a cross section of energizer 34 through an axial channel 68. These channels allow interstage pressure to flow over energizer 34, toward the system pressure region, upstream.

Figure 17:
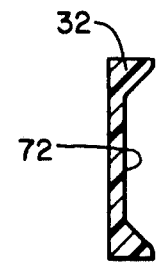
FIG. 17 is a cross sectional view of the seal ring of FIG. 16 along the line 17—17.

When the system pressure is less than the interstage pressure, sealing between rod bore 24 and rod 26 does not occur. The annular seal ring 32 as shown in cross section in FIG. 17, contains a circumferential recess 72 to help energizer 34 engage seal ring 32 within gland 28. An alternate embodiment of first seal assembly 20 has only one backup ring 36 on the upstream side of gland 28.

The operation of sealing system in both the one backup ring and two backup ring configurations will now be discussed. Referring to FIGS. 7–10, upon system activation, system pressure in the system pressure region 48 will force seal ring 32 and energizer 34 within the gland 28 toward interstage volume 46. The pressure difference between interstage volume 46 and system pressure region 48 are such that seal ring 32 and energizer 34 contact gland wall 74. Because of sealing of the second or secondary seal assembly 40 shown in FIGS. 7–10, interstage pressure is built up in interstage volume 46, which pressure is generally greater than the pressure downstream from secondary seal assembly 40 in ambient or outside pressure region 50. When the system pressure upstream from the first or primary seal assembly 20 decreases to a value lower than the interstage pressure, a pressure relieved state takes place.

Figure 8:
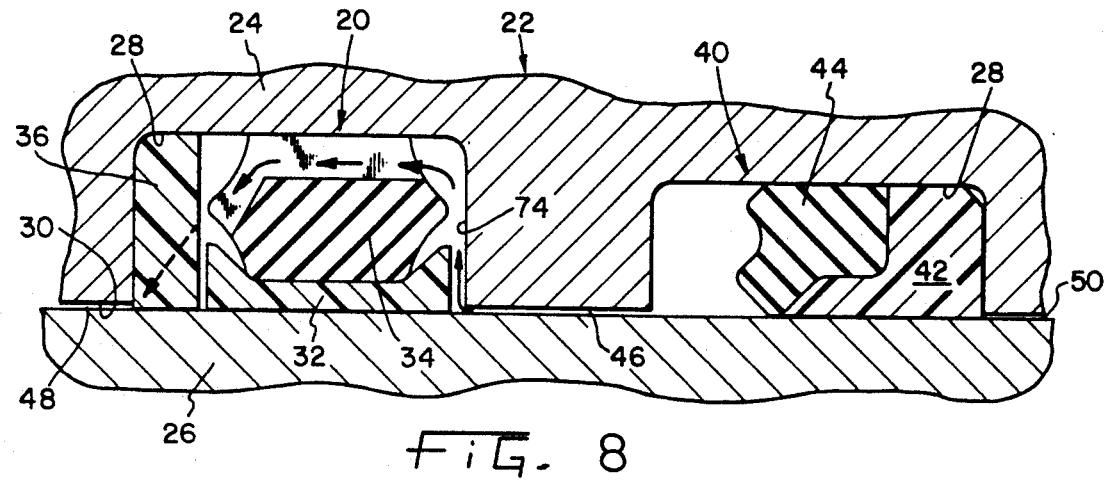
FIG. 8 is a cross sectional view of the sealing system of FIG. 7 in a pressure relieving state.
Figure 10:
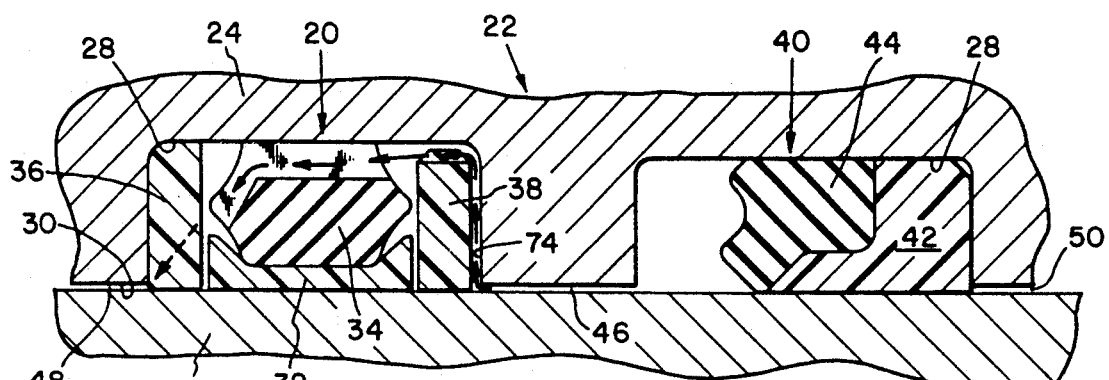
FIG. 10 is a cross sectional view of the sealing system of FIG. 9 in a pressure relieving state.

This relieved state causes the first or primary seal assembly 20 to move slightly upstream, thereby allowing interstage pressure to flow through axial channels 68 and radial channels 70 of energizer 34 and through the various channel means in the backup ring 36 or backup rings 36 and 38. The arrows in FIGS. 8 and 10 show a path of pressure relief from interstage pressure volume 46 to system pressure region 48 through energizer 34 and backup rings 36 and 38.

Since the interstage pressure volume 46 is then substantially at the same pressure as the pressure in system pressure region 48, friction is reduced and manual operation of rod 26 within rod bore 24 is possible.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sealing system for use in sealing a rod bore and reciprocating rod, said rod bore and said rod including a pair of glands separating a system pressure region from an ambient pressure region, said sealing system comprising:
   first and second seal assemblies, each of said seal assemblies adapted to be respectively disposed in one of said glands, said seal assemblies defining an interstage volume, said first seal assembly including a pressure relieving means for relieving pressure in said interstage volume whereby said sealing system may operate in either a pressurized state or pressure relieved state;
   said pressure relieving means including at least one backup ring, said backup ring having a channel means for allowing pressure to be relieved from said interstage volume when said sealing system is in said pressure relieved state.

2. The sealing system according to claim 1 wherein said pressure relieving means further comprises:
   a generally annular energizer, formed of an elastomeric material having an inside diameter and a circumference, said elastomer having a first radial face and a second radial face, wherein said elastomer is operatively arranged to seal only in a downstream direction toward said interstage volume;
   a seal ring means for providing a high pressure seal between said rod and said rod bore, said energizer urging said seal ring means into sealing engagement with said rod; and
   said at least one backup ring being located adjacent said seal ring means and said energizer.

3. The sealing system according to claim 2 wherein said backup ring is disposed upstream from said seal ring means and said energizer, toward said system pressure region.

4. The sealing system according to claim 2 in which said channel means comprises a cut out sector of said backup ring to prevent sealing of said backup ring in said gland.

5. The sealing system according to claim 2 in which said backup rings are two in number, the first said backup ring located upstream from said seal ring means and said energizer, the second said backup ring located downstream from said seal ring means and said energizer.

6. The sealing system according to claim 5 in which said channel means in said first backup ring comprises a cut out sector to prevent sealing of said first backup ring in said gland and said channel means in said second backup ring comprises a circumferential chamfer and an axial notch to prevent sealing of said second backup ring in said gland.

7. A sealing system, adapted to be disposed in an annular gland in a rod bore and reciprocating rod arrangement, said sealing system adapted to separate a system pressure region from an ambient pressure region and operating in either a pressurized state or a pressure relieved state, said system comprising:
   a generally annular energizer formed of an elastomeric material and having an inside diameter and a circumference, said elastomer having a first radial face and a second radial face, wherein said elastomer seals only in a downstream direction toward the ambient pressure region;
   a seal ring means for providing a high pressure seal between said rod and said rod bore, said energizer urging said seal ring means into sealing engagement with said rod; and
   at least one backup ring adjacent said seal ring means and energizer, said backup ring having a channel means for allowing pressure to pass to said system pressure region when said sealing system is in said pressure relieved state.

8. The sealing system according to claim 7 in which said circumference of said energizer has at least one generally axial channel connecting said first and said second radial faces, one of said radial faces having a least one generally radial channel connecting said inside diameter and said circumference, thereby allowing said energizer to seal in a downstream direction toward and, when said sealing system is in said pressure relieved state, to release pressure in an upstream direction.

9. The sealing system according to claim 7 in which said backup ring is disposed upstream from said seal ring and said energizer.

10. The sealing system according to claim 7 in which said channel means comprises a cut out sector of said backup ring to prevent sealing of said backup ring in said gland.

11. The sealing system according to claim 7 including two said backup rings, a first said backup ring disposed upstream from said seal ring means and said energizer, a second said backup ring disposed downstream from said seal ring means and said energizer.

12. The sealing system according to claim 11 in which said channel means in said first backup ring comprises a cut out sector to prevent sealing of said first backup ring in said gland and said channel means in said second backup ring comprises a circumferential chamfer and an axial notch to prevent sealing of said second backup ring in said gland.

13. A sealing system for use in sealing a rod bore and reciprocating rod, said rod bore and said rod including a pair of glands separating a system pressure region from an ambient pressure region therein, said sealing system that may operate in either an pressurized state or a pressure relieved state, said sealing system comprising:
 a first and second seal assemblies, each said assembly adapted to be respectively disposed in one of said glands, said seal assemblies defining an interstage volume between a system pressure region and an ambient pressure region, said first seal assembly including a pressure relieving means for relieving pressure in said interstage volume;
 said first assembly comprising an energizer, formed of an elastomeric material having an inside diameter and a circumference, said elastomer having a first radial face and a second radial face, said circumference having at least one generally axial channel connecting said first and said second radial faces, said radial face opposite said interstage volume including at least one generally radial channel, said radial channel connecting said inside diameter and said circumference, thereby causing sealing only in a downstream direction toward said interstage volume and, when said sealing system is in a pressure relieved state, causing pressure to be released in an upstream direction toward said system pressure region;
 a seal ring for providing a high pressure seal disposed between said rod and said rod bore, said energizer urging said seal ring into sealing engagement with said rod; and
 two backup rings located adjacent said seal ring and energizer, said first backup ring being discontinuous to prevent sealing of said backup ring in said gland, said first backup ring disposed upstream from said seal ring and said energizer toward said system pressure region, said second backup ring including a circumferential chamfer and an axial notch to prevent sealing of said second backup ring in said gland, said second backup ring disposed downstream from said seal ring and said energizer, toward said interstage pressure volume.

14. A sealing system for use in sealing a rod bore and reciprocating rod, said rod bore and said rod including a pair of glands separating a system pressure region from an ambient pressure region, said sealing system comprising:
 first and second seal assemblies, each of said seal assemblies adapted to be respectively disposed in one of said glands, said seal assemblies defining an interstage volume, said first seal assembly including a pressure relieving means for relieving pressure in said interstage volume whereby said sealing system may operate in either a pressurized state or a pressure relieved state;
 said pressure relieving means comprising a generally annular energizer formed of an elastomeric material and having an inside diameter and a circumference, said elastomer having a first radial face and a second radial face, said circumference including at least one generally axial channel connecting said first and said second radial faces, one of said radial faces of said energizer having at least one generally radial channel connecting said inside diameter and said circumference, thereby allowing said energizer to seal in a downstream direction toward said interstage volume and, when said sealing system is in said pressure relieved state, to release pressure in an upstream direction;
 a seal ring means for providing a high pressure seal between said rod and said rod bore, said energizer urging said seal ring means into sealing engagement with said rod; and
 at least one backup ring located adjacent said seal ring means and said energizer, said backup ring including a channel means for allowing pressure to be relieved from said interstage volume when said sealing system is in said pressure relieved state.

* * * * *